May 26, 1970      A. R. D. TOSLER      3,514,088
CAR BUFFER
Filed Feb. 14, 1968
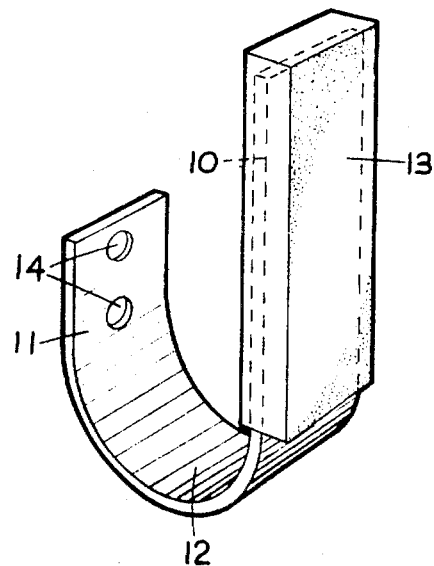
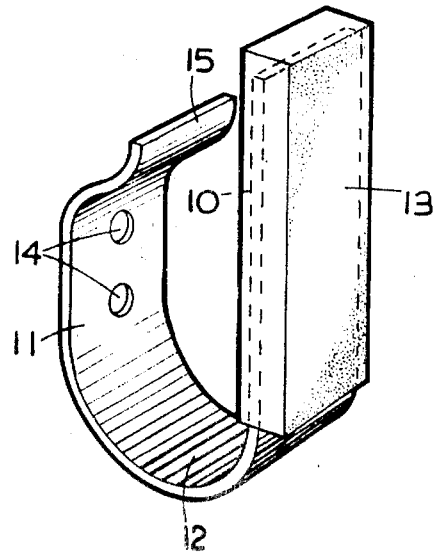

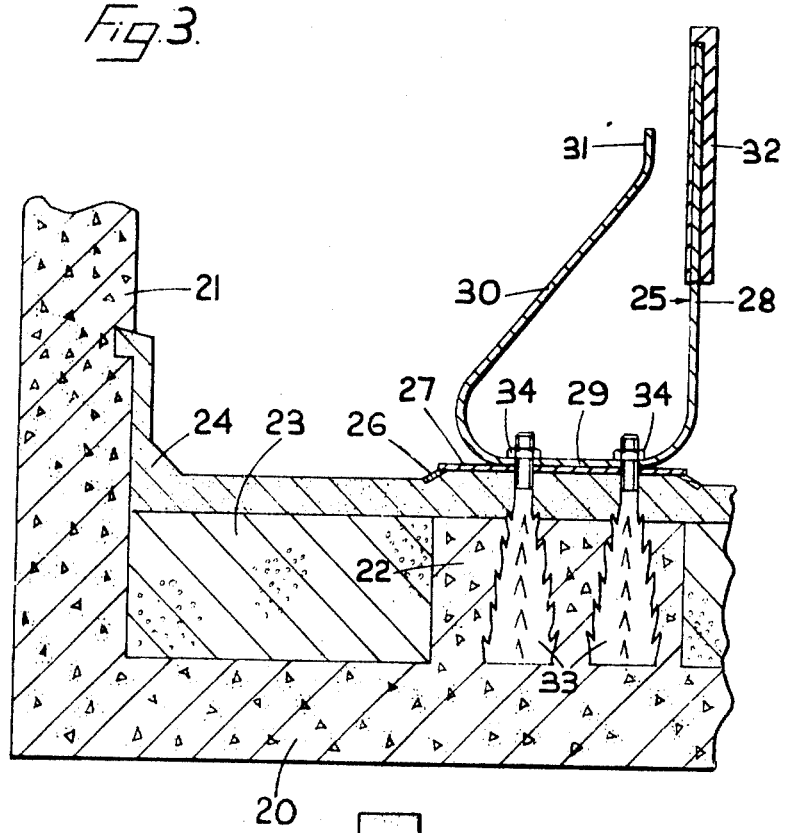
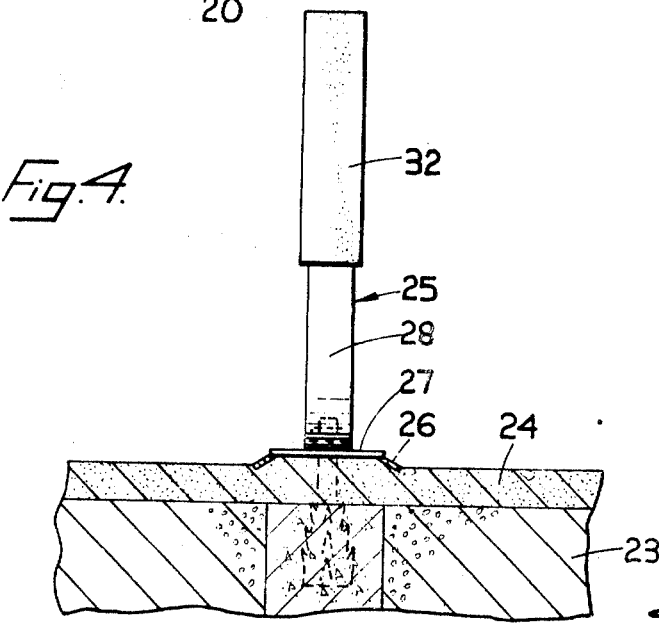

United States Patent Office 3,514,088
Patented May 26, 1970

3,514,088
CAR BUFFER
Arthur Robert David Tosler, 39 Alexandra Ave.,
South Harrow, England
Filed Feb. 14, 1968, Ser. No. 705,335
Claims priority, application Great Britain, Feb. 15, 1967,
7,140/67
Int. Cl. F16f 1/26
U.S. Cl. 267—1                                    5 Claims

ABSTRACT OF THE DISCLOSURE

A buffer for protecting a wall against damage by a vehicle which consists of a U-shaped spring steel strip on one arm of which a resilient pad is mounted.

BACKGROUND OF THE INVENTION

Field of the invention

The invention relates to a buffer for mounting either on a wall or adjacent a wall for protecting the wall from damage by a motor vehicle.

Description of the prior art

Crash barriers and bollards have been provided to protect walls from damage from vehicles but these have a number of disadvantages in that, if a vehicle strikes them even at a low speed the vehicle bumper is liable to be dented and the barrier or bollard is also likely to be damaged.

SUMMARY OF THE INVENTION

The present invention provides a buffer which includes a spring steel element of somewhat U-shaped in side elevation comprising a base and a pair of arms with a resilient pad secured to one of the arms and extending for a substantial part of the length of said arm.

BRIEF DESCRIPTION OF THE DRAWINGS

FIG. 1 is a perspective view of one form of buffer for mounting on a wall,

FIG. 2 is a perspective view of a second form of buffer for mounting on a wall,

FIG. 3 is a sectional side elevation showing a further form of buffer mounted on a floor adjacent a parapet wall, and FIG. 4 is a front view of the buffer shown in FIG. 3.

DESCRIPTION OF THE PREFERRED EMBODIMENTS

The buffer shown in FIG. 1 consists of a spring steel element which is pressed out from spring steel strip which is three inches wide and ⅜" thick. The spring steel strip is pressed so as to be somewhat U-shaped, one arm 10 of the U being, for example, 10" in length and the other arm 11 of the U being, for example, 5" in length. The base 12 of the U is of arcuate form and with the arms 10 and 11 having dimensions specified above, the base of the U is conveniently semi-circular, the circle having a radius of 3".

A rubber sleeve or pad 13 is fitted onto the longer arm 10 of the U, the rubber pad being, for example, 14" in height, 3½" in width and 1⅜" in thickness. The rubber pad is formed as an extrusion and has a slot to receive said one arm 10 and the slot is of the same dimensions as the arm 10 and is spaced a quarter of an inch from the rear face of the pad 13. When the pad 13 has been slid in position onto the arm 10 it is secured to the arm 10 by means of an adhesive mastic inserted into the upper end of the slot in the pad, the adhesive mastic being such that it can withstand weathering.

The other arm 11 of the U-shaped spring steel element is formed with two holes 14 which are drilled to receive ⅝" fixing bolts whereby the buffer is secured to a wall.

The height at which the buffer is secured to the wall is such that should a motor vehicle be driven close to the wall, the bumper of the motor vehicle will engage the presented face of the pad 13 and the arm 10 will be resiliently deformed, the resilience of the pad 13 and of the arm 10 absorbing the impact and preventing damage to the wall, and assuming the car is being driven at say about five miles per hour, the bumper of the motor vehicle will not be damaged. If the motor vericle is being driven at say ten miles per hour there is a likelihood of the vehicle bumper being dented.

The form of buffer shown in FIG. 2 of the drawings is much the same as that shown in FIG. 1 and like reference numerals are used to indicate corresponding parts of the buffer of FIG. 2.

The buffer of FIG. 2 differs from that of FIG. 1 in that the upper end of the other arm 11 is bent first inwardly and then upwardly to provide a restraining portion 15. The arrangement is such that, should a motor vehicle strike the rubber pad 13 with an impact such that the arm 10 deflects rearwardly a sufficient distance to engage said restraining portion 15, the additional resistance to movement afforded by the restraining portion 15 will ensure that the arm 10 will not be deflected rearwardly a sufficient distance that its upper end strikes the wall on which the buffer is mounted.

The buffers shown in FIGS. 1 and 2 are particularly intended to be mounted on a parapet wall of a multi-storey carpark though they may be mounted on any other wall which is situated in a position such that there is a likelihood of motor vehicles bumping into it. For example, a buffer of somewhat larger dimensions than those described above in relation to FIGS. 1 and 2 could be mounted on an external wall of a building which is situated close to a highway, particularly one near a road junction or near the bottom of a hill, the buffer then reducing the likelihood of the wall being damaged if a vehicle goes out of control.

The form of buffer shown in FIGS. 3 and 4 is for mounting on a floor adjacent a parapet wall of a multi-storey carpark, the carpark including a concrete deck 20 formed integrally with the parapet wall 21, the deck 20 including an upstanding portion 22 around which the screed 23 is located and asphalt is placed on top of the screed 23 and the upstanding portion 22, the asphalt screed 24 also being secured to the parapet wall 21. The screed 24 includes a slightly raised portion at the position at which the buffer 25 is to be mounted, the slightly raised portion being surrounded by a sheet metal tray 26 on which a mild steel plate 27 is placed.

The buffer 25 is formed from spring steel of the same dimensions as described above in relation to FIGS. 1 and 2 and is again of a somewhat U-shaped form including a first limb 28 which extends vertically relative to the floor, a base 29 with extends horizontally and a third limb 30 which extends at an angle of the order of 60° to the horizontal, the base 29 being joined by radiused corners to the two arms 28 and 30 and the upper end of the arm 30 comprising a portion 31 which is bent so as to extend vertically spaced a short distance from the rear face of a rubber pad 32 which is fitted onto the upper end of the arm 28.

The base 29 of the U-shaped buffer is provided with a pair of fixing holes to receive the stems of rag bolts 33, onto which shanks nuts 34 are tightened to secure the buffer 25 to the floor. The buffer 25 functions in substantially the same manner as the buffer shown in FIG. 2 and the upper end portion 31 engages the rear face of the pad 32 when an impact is applied to the pad 32 so as to cause the arm 28 to deflect resiliently rearwardly, the engagement of the portion 31 with the pad 32 providing additional restraining means for absorbing the impact.

It is understood that other resilient materials could be used as equivalents to the rubber pad 13 disclosed herein, and that all of such resilient materials could be secured to outer arms 10 and 28 by any appropriate means.

What I claim then is:

1. A buffer comprising an elongated strip of spring steel and resilient means therefor, said strip being bent about an axis transverse to the longitudinal axis of said strip, said bent strip providing a base portion and a pair of first and second arms extending in the same direction from said base portion, said resilient means carried solely by said first arm.

2. A buffer according to claim 1, wherein said base is arcuate, said arms are parallel and said first arm is longer than said second arm.

3. A buffer according to claim 1, wherein said arms are of substantially even length, said second arm being bent inwardly toward said first arm and then upwardly to provide a restraining portion for the inward deflection of said first arm.

4. A buffer according to claim 1, wherein said base portion is substantially horizontal, said first arm extending substantially perpendicular thereto and said second arm extending inwardly toward said first arm at an angle to said base portion, said second arm terminating in a vertically bent portion parallel to said first arm for restraining inward deflection of said first arm.

5. A buffer according to claim 1, wherein said resilient means comprises a sleeve having an inner slot for insertion of at least the upper portion of said first arm therein.

UNITED STATES PATENTS

References Cited 2,806,688   9/1957   Pollock.
3,197,189   7/1965   Pember et al.

JAMES B. MARBERT, Primary Examiner